Patented Nov. 16, 1948

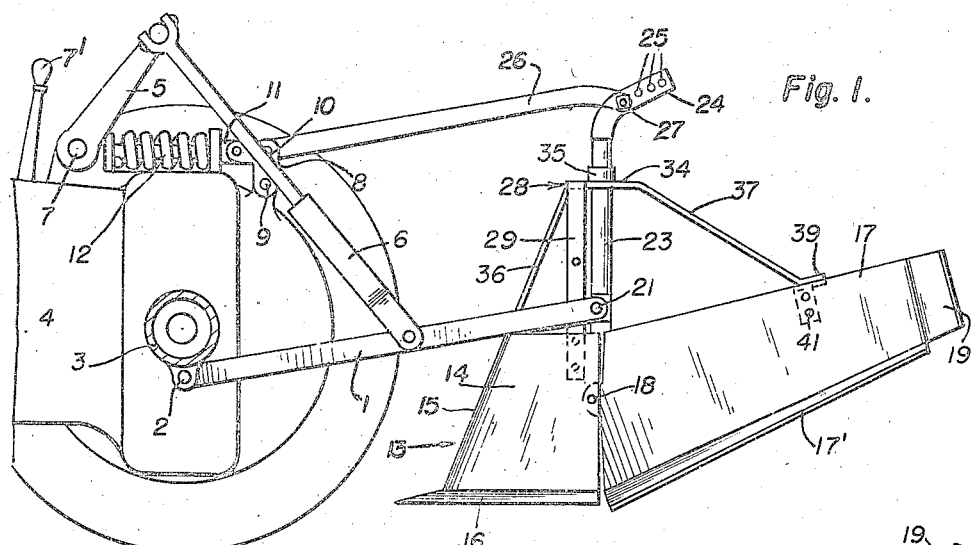
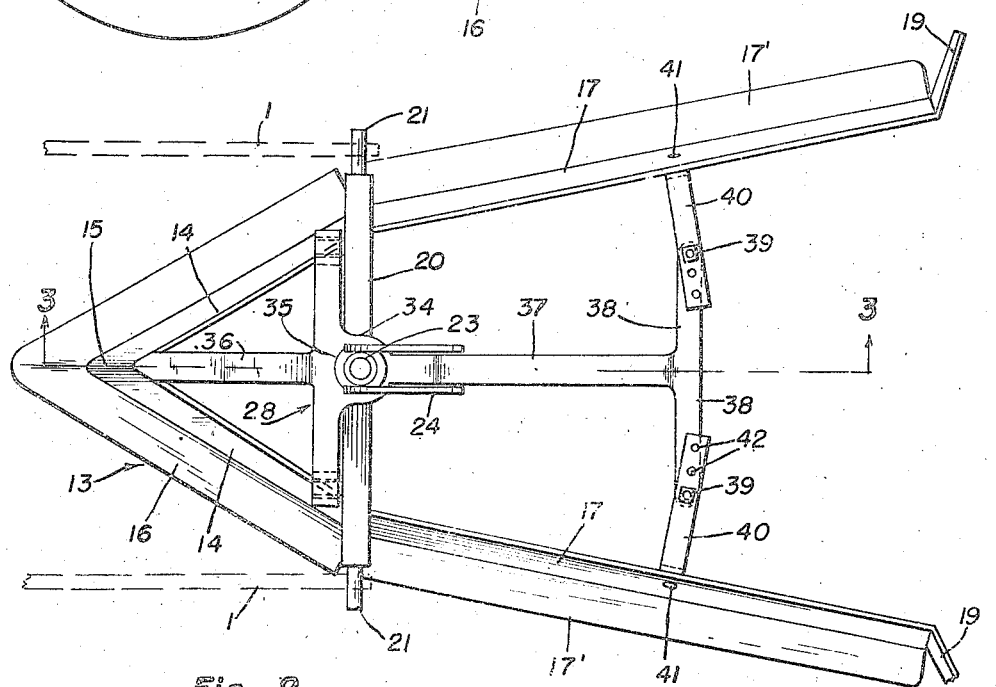

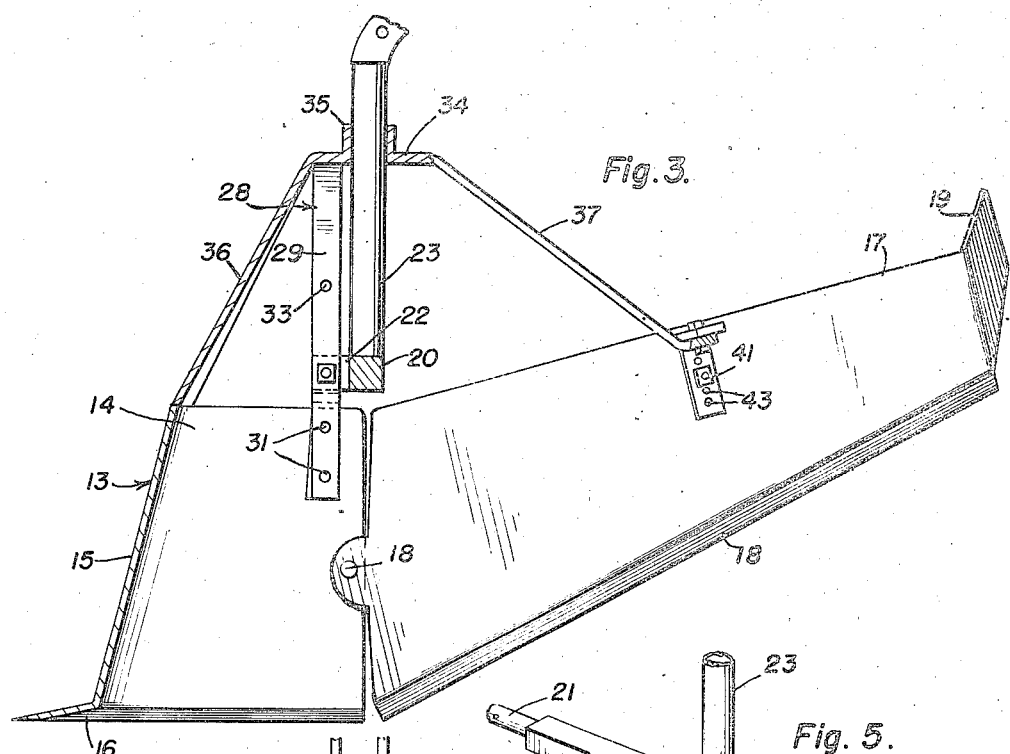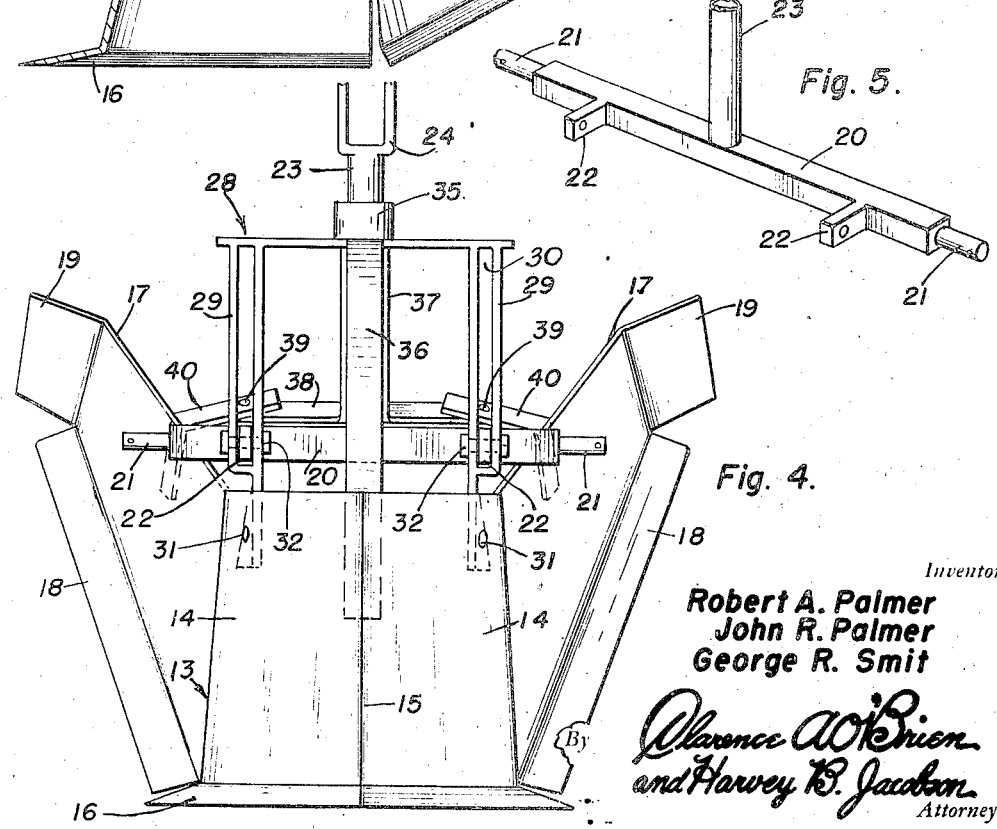

2,453,723

UNITED STATES PATENT OFFICE 2,453,723

DITCHER

Robert A. Palmer, John R. Palmer, and George R. Smit, Parma, Idaho, assignors to Western Corrugator Co., Parma, Idaho Application December 9, 1946, Serial No. 714,940

4 Claims. (Cl. 37—98)

Our invention relates to improvements in ditchers of the tractor-drawn type.

The primary object of our invention is to equip a tractor having a power lift mechanism with a ditcher particularly designed for lowering and raising by the power lift mechanism of the tractor into ditching and carrying positions, respectively, and which is of simple form and construction with parts arranged for quick, easy adjustment to vary the depth and width of the ditch being dug, will not readily get out of order, and is comparatively inexpensive to manufacture.

Other and subordinate objects, also comprehended by our invention, together with the precise nature of our improvements, and the advantages thereof, will be readily understood when the succeeding description and claims are read with reference to the drawings accompanying and forming part of this specification.

In said drawings:

Figure 1 is a fragmentary view in side elevation, partly in section, of our improved ditcher attached to the power lift mechanism of a tractor, Figure 2 is a view in plan, and drawn to a larger scale, Figure 3 is a view in longitudinal section taken on the line 3—3 of Figure 2, Figure 4 is a view in front elevation of the ditcher, Figure 5 is a view in perspective of the draw-bar.

Referring to the drawings by numerals, as shown therein, our improved ditcher is especially designed to be attached to the hydraulic power lift mechanism of the "Ford-Ferguson" tractor of commerce. This power lift mechanism being well known and understood in the art has merely been shown generally as sufficient to a proper understanding of the invention, the numeral 1 designating the usual pair of power lift side arms pivoted, as at 2, at front ends thereof to the rear axle housing 3 of the tractor 4 for vertical swinging movement into lowered and elevated positions. The side arms 1 are swingable by means of a pair of crank arms, one of which is shown at 5, operatively connected to said side arms 1 by a pair of links, one being shown at 6. The crank arms 5 are fast on a rock shaft 7 journaled on the tractor 4 and hydraulically operative under control of a hand lever 7'. The power lift mechanism further includes an overload automatic control comprising a rocker 8 pivoted, as at 9, on the tractor 4 and, as at 10, to a plunger 11 spring-loaded, as at 12, against operation of the rocker and adapted, when thrust endwise by said rocker 8, in opposition to the spring 12, to cause hydraulic operation of the rock shaft 7 in a manner to effect raising of the side lift arms 1.

For a detailed disclosure of the power lift mechanism of the "Ford-Ferguson" tractor, reference may be had to U. S. Letters Patent No. 2,118,180 to H. G. Ferguson.

According to our invention, in the preferred embodiment thereof, a ditcher unit is provided for attachment to the above described power lift mechanism and embodying a V-shaped plow 13, with rearwardly diverging flat side plates 14 of a substantial height which converge upwardly, slightly, and form an upwardly and rearwardly inclined straight, front apex edge 15, said plates rising from a V-shaped undercutting blade 16 forming a lateral bottom edge flange on the plates inclining slightly outwardly and downwardly, laterally, from the same.

A pair of elongated spreader panels 17 incline endwise from the rear edges of the plates 14, and which diverge, relatively, from said plates 14 and converge, relatively, upwardly, the angle of divergence of said panels 17 being less than the angle of divergence of the plates 14. The spreader panels 17 also taper edgewise from the front ends of the same, which are pivotally connected, as at 18, to the rear edges of the side plates 14. Further, the spreader panels 17 incline upwardly and rearwardly and are provided along the bottom edges thereof with undercutting outturned blades 17'. The rear ends of the spreader panels 17 terminate in out-turned, obtuse angled deflectors 19 extending along said ends. The pivotal connection 18 provides for lateral and vertical adjustment of the spreader panels 17 on the side plates 14 of the plow 13, for a purpose presently seen.

The described plow 13 and spreader panels 17 are suspended from a draw-bar 20 having reduced ends 21 journaled in the rear ends of the side arms 1, a pair of forwardly extending apertured lugs 22 being provided on said draw-bar 20 adjacent said ends 21, and a central, upstanding post 23 thereon arising therefrom with a rearwardly inclined, upper, forked end 24 provided with apertures 25 therein spaced along the same in pairs. A link bar 26 is pivoted at one end on the pivot 10 of the rocker 8 with its other end adapted to be connected in the forked end 24 of the post 23 by a pin 27 adapted to be inserted through the rear end of said link bar and through a selected pair of apertures 25.

A U-shaped yoke 28 with vertically slotted legs 29 extend crosswise of the plow 13, in upstanding position, with the lugs 22 extending into the slots 30 of said legs, and the lower ends of said legs bolted, as at 31, to the side plates 14 adjacent the rear, upper corners of said plates. Bolts 32 extended through the lugs 22 and adapted to be inserted selectively through vertically spaced pairs of apertures 33 in the legs 29 provide for vertically adjusting the yoke 28, and hence the plow 13 and spreader panels 17 on said draw-bar 20, as a unit. A rearwardly extending, central, top guide-head 34 on the yoke 20 is formed with a sleeve 35 thereon slidable vertically on the post 23 and prevents said yoke 28 from tilting on the bolts 32, and consequently the plow 13 and spreader panels 17 from tilting relative to the draw-bar 20. A bar-like brace 36 extends upwardly and rearwardly from the upper edge of the plow 13, at the angle formed by the side plates 14, and is suitably connected to the head 34. A panel-supporting bar 37 extends downwardly and rearwardly from the head 34 with a transverse rear end extension 38 intermediate the spreader panels 17. The cross extension 38 is bolted at its ends, as at 39, to a pair of angle brackets 40 bolted, as at 41, to the spreader panels 17 intermediate the ends of said panels. The angle brackets 40 are provided with longitudinally spaced apertures 42 therein for selective insertion of the bolts 39 therein, whereby the spreader panels 17 may be adjusted toward or from each other, laterally, on the pivots 18 to vary the angle of divergence thereof. Similar apertures 43 are provided in the angle brackets 40 for selective insertion of the bolts 41 therein, whereby the spreader panels 17 may be adjusted vertically on the pivots 18 to vary the vertical inclination thereof.

Referring now to the operation of the described invention. The described ditching unit may be lowered to the ground and into the same by lowering of the side arms 1 of the power lift mechanism, under control of the hand lever 7'. The V-shaped undercutting blade 16 of the plow 13 acts to pull said plow into the ground, and the blades 17' of the spreader panels 17 function to pull the unit into the ground and maintain the same in ditching position. The V-shaped plow 13 opens the ditch and the spreader panels 17 enlarge the same laterally. The deflectors 19 scrape the sides of the ditch and push the earth forwardly to prevent the same from falling into the ditch behind said spreader panels. The spreader panels 17 may be adjusted vertically on the pivots 18, in the manner described, to increase or decrease the angle of inclination of the blades 17' as may be required to maintain the unit in ditching position. Also, said spreader panels 17 may be adjusted laterally on the pivots 18 to vary the width of the ditch as required. The power lift mechanism, it may be explained, is limited in operation as to downward swinging, or lowering, of the side lift arms 1. Therefore, provision has been made for vertical unitary adjustment of the ditching unit on the draw-bar 20, in the manner already explained, to vary the depth at which the plow 13 will dig, in the limit of downward swinging or lowering of said side arms 1. By adjusting the connection between the link bar 26 and the forked end 24 of the post 23, in the manner already described, the ditching unit may be pitched downwardly and forwardly as desired, in set position, to cause the same to dig into the ground.

As will be understood, the link bar 26 forms with the side arms 1 a parallel link motion whereby the setting of the ditching unit will not be affected by raising and lowering of the same when the unit is swung upwardly or downwardly by said side arms 1.

The side arms 1, in ditching operations, are under tension, and the link bar 26 under compression, for reasons which will be clear. Therefore, under overload compression against said link bar 26 arising because of obstruction to forward travel of the plow 13 acting to stall the same, the plunger 11 will be thrust by said link bar 26 endwise to cause hydraulic operation of the side arms 1 to lift the ditching unit out of the ground, to be again lowered when the obstruction has been passed. By controlling hydraulic operation of the power lift mechanism, through the hand lever 7', to swing the side arms 1 upwardly, the ditching unit may be raised into elevated position, as shown in Figure 1, for carrying.

The foregoing will, it is believed, suffice to impart a clear understanding of our invention, without further explanation.

Manifestly, the invention, as described, is susceptible of modification without departing from the inventive concept, and right is herein reserved to such modifications as fall within the scope of the appended claims.

What we claim is:

1. A ditch digging unit for use on a tractor having a pair of vertically swingable power lift side arms, and a vertically swingable compression link above said arms, said unit comprising a draw-bar adapted to be journaled at the ends thereof in said side arms and provided with an upstanding central post adapted to be pivotally connected to said compression link, an upstanding yoke vertically slidable on said post into different set positions, a plow fast on the lower ends of said yoke, and a pair of elongated spreader panels pivotally mounted at ends thereof on said plow to extend endwise from opposite sides thereof in divergent relation, the pivotal mounting for said panels providing for swinging adjustment of the panels vertically and laterally, out-turned deflector extensions on the other ends of said panels, and means for attaching said panels to said yoke in adjusted positions thereof.

2. A ditch digging unit for use on a tractor having a pair of vertically swingable power lift side arms, and a vertically swingable compression link above said arms, said unit comprising a draw-bar adapted to be journaled at the ends thereof in said side arms and provided with an upstanding central post adapted to be pivotally connected to said compression link, an upstanding yoke vertically slidable on said post into different set positions, a plow fast on the lower ends of said yoke, and a pair of elongated spreader panels pivotally mounted at ends thereof on said plow to extend endwise from opposite sides thereof in divergent relation, the pivotal mounting for said panels providing for swinging adjustment of the panels vertically and laterally, out-turned deflector extensions on the other ends of said panels, and means for attaching said panels to said yoke in adjusted positions thereof, said plow being V-shaped in cross-section with straight side walls diverging rearwardly from a vertical cutting edge slanting rearwardly, and a V-shaped undercutting blade extending along the lower edges of said blades and inclining laterally downwardly therefrom.

3. A ditch digging unit for use on a tractor having a pair of vertically swingable power lift side arms, and a vertically swingable compression link above said arms, said unit comprising a draw-bar adapted to be journaled at the ends thereof in said side arms and provided with an upstanding central post adapted to be pivotally connected to said compression link, an upstanding yoke vertically slidable on said post into different set positions, a plow fast on the lower ends of said yoke, and a pair of elongated spreader panels pivotally mounted at ends thereof on said plow to extend endwise from opposite sides thereof in divergent relation, the pivotal mounting for said panels providing for swinging adjustment of the panels vertically and laterally, out-turned deflector extensions on the other ends of said panels, and means for attaching said panels to said yoke in adjusted positions thereof, said panels having undercutting bottom edge blades extending longitudinally thereof on outer sides of the same.

4. A ditch digging unit for use on a tractor having a pair of vertically swingable power lift side arms, and a vertically swingable compression link above said arms, said unit comprising a draw-bar adapted to be journaled at the ends thereof in said side arms and providing with an upstanding central post adapted to be pivotally connected to said compression link, an upstanding yoke vertically slidable on said post into different set positions, a plow fast on the lower ends of said yoke, and a pair of elongated spreader panels pivotally mounted at ends thereof on said plow to extend endwise from opposite sides thereof in divergent relation, the pivotal mounting for said panels providing for swinging adjustment of the panels vertically and laterally, out-turned deflector extensions on the other ends of said panels, and means for attaching said panels to said yoke in adjusted positions thereof, said means comprising a bar on said yoke having an end cross extension and bracket connections between said cross extension and said panels adjustable relative to said extension and on said panels respectively.

ROBERT A. PALMER.
JOHN R. PALMER.
GEORGE R. SMIT.

No references cited.